United States Patent [19]

Okamoto et al.

[11] Patent Number: 5,107,938

[45] Date of Patent: Apr. 28, 1992

[54] APPARATUS FOR DETECTING POSITION OF UNDERGROUND EXCAVATOR

[75] Inventors: Akira Okamoto; Shoichi Sakanishi; Norio Mitani; Yoshihisa Yamamoto, all of Hirakata, Japan

[73] Assignee: Kabushiki Kaisha Komatsu Seisakusho Corporation, Tokyo, Japan

[21] Appl. No.: 684,933

[22] PCT Filed: Aug. 30, 1990

[86] PCT No.: PCT/JP90/01106

§ 371 Date: Apr. 26, 1991

§ 102(e) Date: Apr. 26, 1991

[87] PCT Pub. No.: WO91/03708

PCT Pub. Date: Mar. 21, 1991

[30] Foreign Application Priority Data

Aug. 31, 1989 [JP] Japan .................. 1-223035

[51] Int. Cl.$^5$ .................. E21B 47/09; E21D 9/06; G01C 15/00; G01V 3/12

[52] U.S. Cl. .................. 175/45; 324/346; 405/184

[58] Field of Search .................. 175/45, 26, 61; 324/326, 339, 342, 346; 405/184; 299/1

[56] References Cited

U.S. PATENT DOCUMENTS

| | | | |
|---|---|---|---|
| 3,712,391 | 1/1973 | Coyne | 175/45 X |
| 4,656,743 | 4/1987 | Thiemann et al. | 175/45 X |
| 4,806,869 | 2/1989 | Chau et al. | 175/45 X |
| 4,984,289 | 1/1991 | Arakawa et al. | 299/1 X |

FOREIGN PATENT DOCUMENTS 62-5116 1/1987 Japan .
63-26526 2/1988 Japan .

Primary Examiner—Stephen J. Novosad
Attorney, Agent, or Firm—Armstrong, Nikaido, Marmelstein, Kubovcik & Murray

[57] ABSTRACT

An apparatus for detecting a position of an underground excavator in tunneling the earth measures automatically: a three-dimensional position of the excavator relative to a predetermined reference position, or three-dimensional positions of a pair of underground excavators relative to each other. The excavators are disposed in opposite ends of a tunnel to be dug, and dig the tunnel toward each other. The apparatus comprises: a plurality of magnetic-field generating means (4a, 4b, 4c) mounted in a second underground excavator (2); a plurality of small-diameter boring means (3a, 3b, 3c) mounted on a first underground excavator (1) oppositely disposed from the second excavator (2); a plurality of magnetic-field detecting means (6a, 6b, 6c) mounted in front-end portions of the small-diameter boring means (3a, 3b, 3c); and an arithmetic means (14) for calculating a relative position of the first excavator (1) relative to the reference position or the second excavator (2) based on lengths of holes bored by the boring means (3a, 3b, 3c) and detection signals issued from the detecting means (6a, 6b, 6c).

5 Claims, 5 Drawing Sheets

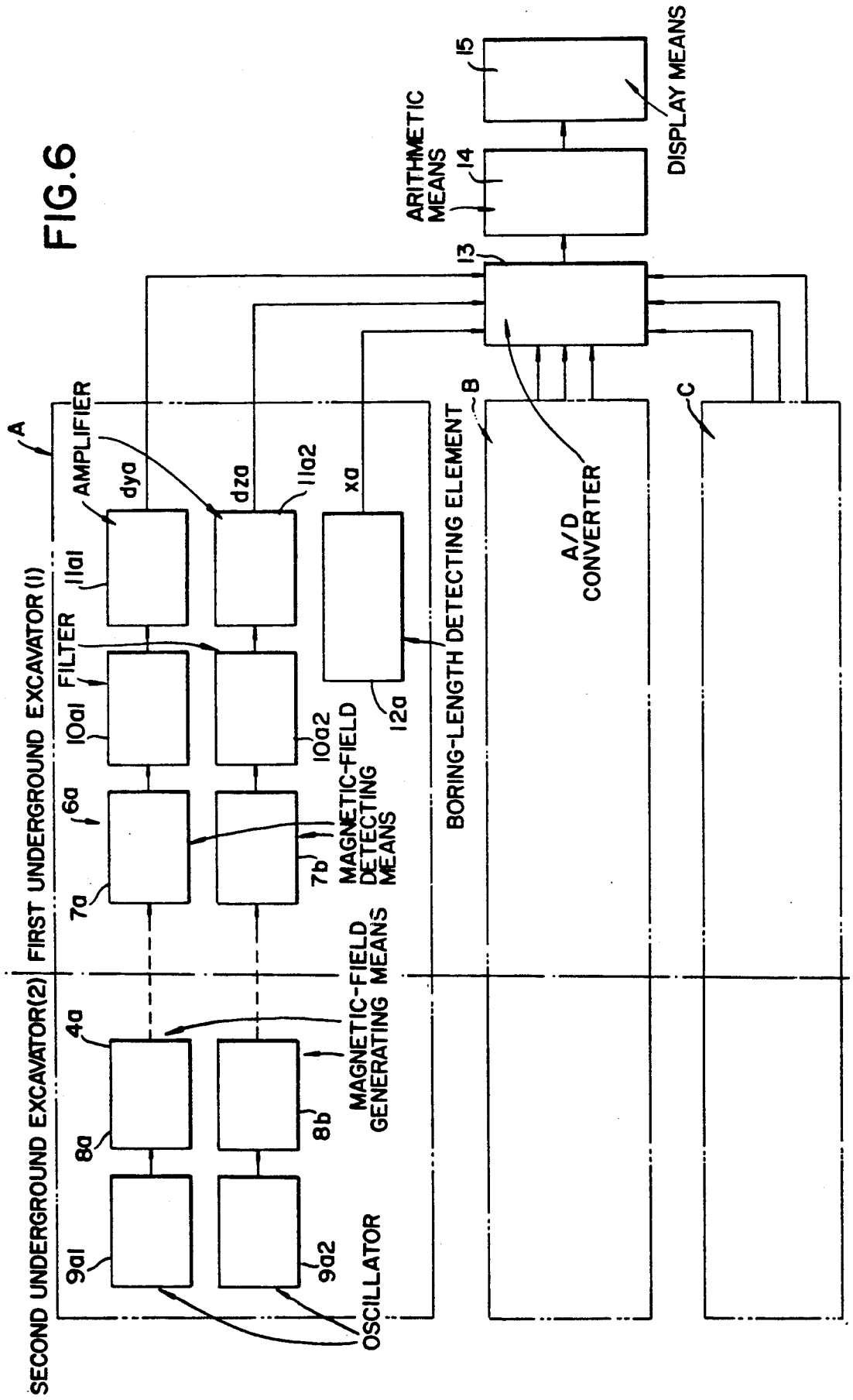

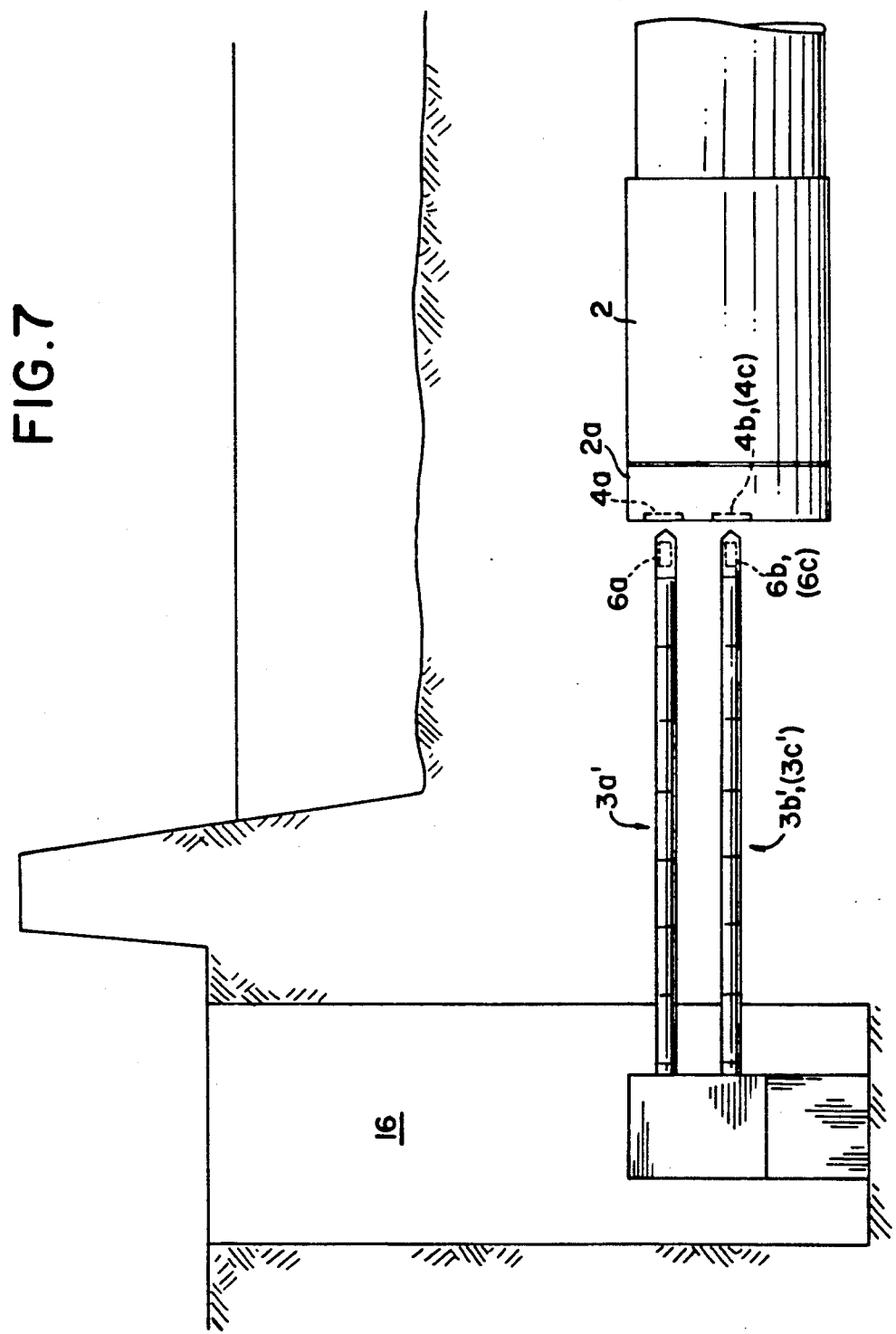

APPARATUS FOR DETECTING POSITION OF UNDERGROUND EXCAVATOR

FIELD OF THE INVENTION

The present invention relates to an apparatus for detecting a position of an underground excavator in tunneling the earth, the position being determined as a relative position of the underground excavator relative to a predetermined reference position.

DESCRIPTION OF THE PRIOR ART

Heretofore, in a so-called shield-method art for tunneling the earth by the use of a shield-type underground excavator, it has been known to determine a position of the underground excavator by making a location survey of the underground excavator by means of a transit, an optical equipment such as a laser unit and like equipments, the laser unit being installed in a starting vertical shaft in the tunneling to issue a laser beam light which is coherent. Namely, in the tunneling, the optical equipment installed in the starting vertical shaft issues the laser beam light to indicate a designed tunneling line. The optical equipment or laser unit issues the laser beam light to a target member mounted on the underground excavator to produce a light spot on the target member, which light spot is measured and analyzed in angle and position so that deviation amounts in angle and position of the underground excavator from the designed tunneling line are determined in the tunneling.

In addition, in tunneling the earth, it has been also known to determine a relative position of the underground excavator relative to a predetermined reference position by means of a suitable system comprising, in combination, a directional gyro, a pressure-gage type sinkage meter, an inclinometer and a distance recorder which uses a length of a segment as a unit for measuring distance.

On the other hand, in submarine-tunnel building, since the number of vertical shafts to be dug is restricted, it is necessary to employ a pair of underground excavators: one of which excavators is installed in a starting vertical shaft to dig a submarine tunnel toward a terminal vertical shaft; and the other is installed in the terminal vertical shaft to dig the submarine tunnel toward the starting vertical shaft; whereby a length of the tunnel to be dug by each of the excavator is reduced. In this case, it is necessary for the excavators to be aligned with a designed tunnel line of the submarine tunnel. However, relative positions of the pair of the excavators have not been ever measured.

The conventional underground excavator using the above-mentioned conventional means for making the location survey of the excavator suffers from the following problems:

(1) A method of making location survey of the underground excavator in a curved tunnel by the use of the transit and the like is disadvantageous in that the method requires many measuring points which make it impossible to make the location survey of the excavator in real time, and, therefore the method is not practical;

(2) A method of making location survey of the underground excavator in a curved tunnel by the use of the laser unit for issuing a laser beam light therefrom is disadvantageous in that a bent portion of the tunnel often prevents the laser beam light of the laser unit installed in the starting vertical shaft from reaching the target member mounted on the excavator, and, therefore it is necessary for the method to often move the laser unit and like optical equipments in the tunneling to an appropriate location for having the laser beam light reach the target member of the excavator. In addition, in the curved tunnel, since it is not possible for the laser unit to have the laser beam light directly pass through the full length of the tunnel, it is necessary to determine relative positions or values of the target member, optical equipments such as the laser unit and the designed tunnel line relative to each other on the basis of relative angles and relative distances between them, so that a tunneling course is determined based on the thus determined relative values, whereby actual deviation amount in current location and current angle of the excavator are calculated based on the thus determined tunneling course. As described above, this method requires a frequent displacement of the optical equipment such as the laser unit and the like, and is not labor-saving in measurement and calculation to decrease the efficiency of excavation operation of the tunnel; and (3) A method of making location survey of the underground excavator in a straight and/or curved tunnel by the use of the directional gyro is disadvantageous in that the method suffers from accumulated errors, and, therefore the method is not adequate for long-distance tunnels as well as steeply-curved tunnels and continuously-curved tunnels. In addition, in case that the pair of the underground excavators are employed to dig a tunnel from the opposite ends thereof, such accumulated errors in measurement of positions of the excavators considerably increase in tunneling the earth.

SUMMARY OF THE INVENTION

Under such circumstances, the present invention was made. Consequently, it is an object of the present invention to provide an apparatus for detecting a position of an underground excavator in tunneling the earth, which apparatus may automatically determine a three-dimensional relative position of, for example: each of a pair of shield-type underground excavators employed in digging a submarine tunnel extending from a starting vertical shaft to a terminal vertical shaft, in each of which vertical shafts each of the excavators in installed in the beginning of the tunneling operation to dig the same submarine tunnel simultaneously; and a shield-type underground excavator employed in tunneling the earth, which excavator is installed in a vertical shaft from which the tunneling operation starts, the three-dimensional relative position of the excavator being automatically determined relative to a predetermined reference position provided in the vertical shaft; whereby the apparatus of the present invention is free from any accumulated errors even when the apparatus is employed in measuring a position of the excavator for digging a long-distance tunnel, since the position of the excavator is not determined through any intergrating mechanism in the apparatus of the present invention.

The above object of the present invention is accomplished in accordance with a first aspect of the present invention, by providing:

An apparatus for detecting a position of an underground excavator in tunneling the earth, comprising:

a plurality of magnetic-field generating means provided in a front-end surface of a first underground excavator;

a plurality of small-diameter boring means each of which bores a small-diameter hole oriented toward the front-end surface of the underground excavator so as to be oppositely disposed from the underground excavator to have a front end thereof disposed in the vicinity of each of the magnetic-field generating means of the underground excavator;

a plurality of magnetic-field detecting means each of which is used for detecting a magnetic field generated by each of the magnetic-field generating means of the underground excavator, each of the magnetic-field detecting means being provided in a front-end portion of each of the small-diameter boring means to issue a detection signal; and an arithmetic means for calculating a relative position of the underground excavator relative to positions of the small-diameter boring means on the basis of the detection signal issued from each of the magnetic-field detecting means and a length of the small-diameter hole bored by each of the small-diameter boring means.

Further, the above object of the present invention is also accomplished in accordance with a second aspect of the present invention, by providing:

The apparatus for detecting the position of the underground excavator in tunneling the earth, as set forth in the first aspect of the present invention, wherein:

each of the small-diameter boring means is provided in a front-end surface of a second underground excavator which digs the tunnel oriented toward the first underground excavator.

Further, the above object of the present invention is also accomplished in accordance with a third aspect of the present invention, by providing:

The apparatus for detecting the position of the underground excavator in tunneling the earth, as set forth in the first aspect of the present invention, wherein:

each of the small-diameter boring means is disposed in each of predetermined reference positions within a vertical shaft.

In the apparatus for detecting the position of the underground excavator in tunneling the earth according to the above aspects of the present invention, a plurality of the small-diameter boring means bore the holes extending from a front-end surface of one of a pair of underground excavators to a front surface of the other of the underground excavators, or bore the holes extending from the predetermined reference positions to a front surface of an underground excavator which tunnels the earth, so that a front-end portion of each of the small-diameter boring means is moved toward the magnetic-field generating means mounted on the front-end surface of the underground excavator, whereby a distance from each of the predetermined reference positions to the underground excavator is determined based on the length of the hold bored by each of the small-diameter boring means. In addition, by detecting the strength of the magnetic field (which is generated by each of the magnetic-field generating means of the underground excavator oppositely disposed from the small-diameter boring means) through each of the magnetic-field detecting means each of which is mounted in each of the front-end portions of the small-diameter boring means, a central position of the underground excavator relative to the predetermined reference positions from which the small-diameter boring means begin to dig the small-diameter holes is determined.

In the present invention, it is possible to automatically determine a three-dimensional relative position of, for example: each of a pair of shield-type underground excavators employed in digging a submarine tunnel extending from a starting vertical shaft to a terminal vertical shaft, in each of which vertical shafts each of the excavators is installed in the beginning of the tunneling operation to dig the same submarine tunnel simultaneously; and a shield-type underground excavator employed in tunneling the earth, which excavator is installed in a vertical shaft from which the tunneling operation starts, the three-dimensional relative position of the excavator being automatically determined relative to a predetermined reference position provided in the vertical shaft; whereby the apparatus of the present invention is free from any accumulated errors even when the apparatus is employed in measuring a position of the excavator for digging a long-distance tunnel, since the position of the excavator is not determined through any intergrating mechanism in calculation in the apparatus of the present invention.

The above object, additional objects, additional embodiments and advantages of the present invention will be clarified hereinbelow to those skilled in the art with reference to the following description and accompanying drawings illustrating preferred embodiments of the present invention according to principles of the present invention.

BRIEF DESCRIPTION OF THE DRAWINGS

FIG. 6 is a block diagram of the first embodiment of the present invention shown in FIG. 1, illustrating a calculation process performed in the first embodiment of the present invention; and FIG. 7 is a schematic diagram of a second embodiment of the present invention, illustrating the entire arrangement of the second embodiment.

DESCRIPTION OF THE PREFERRED EMBODIMENTS

Figure 1:
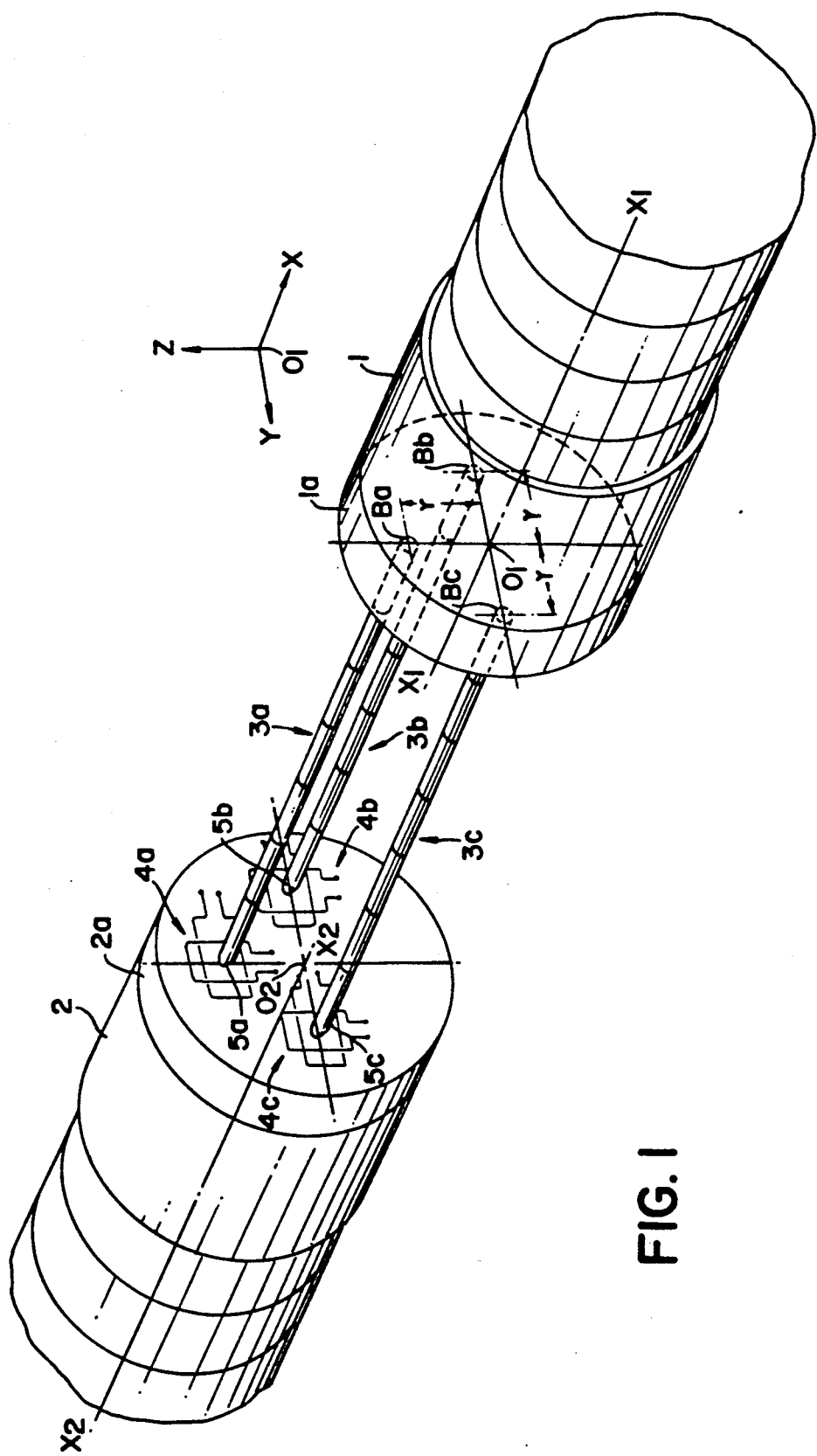
FIG. 1 is a schematic perspective view of a first embodiment of the present invention, illustrating the entire arrangement of the first embodiment.

Hereinbelow, a plurality of preferred embodiments of the present invention will be described in detail with reference to the accompanying drawings.

First of all, a first embodiment of the present invention will be described with reference to FIGS. 1 to 6.

In the drawings: the reference numerals 1 and 2 denote a first and a second underground excavator, respectively, These excavators 1, 2 are oppositely disposed from each other so as to be in opposite ends of a tunnel to be dug. Each of the underground excavators 1, 2 is of a rotary-cutter type. Consequently, the underground excavators 1 and 2 are provided with cutter drums 1a and 2a, respectively. Each of the cutter drums 1a, 2a is provided with cutters (not shown) in its front-end surface. In tunneling the earth, the cutter drums 1a, 2a are rotatably driven to tunnel the earth. The thus dug earth or muck is received in the cutter drums 1a, 2a and transferred to trailing sides of the underground excavators 1, 2. In operation, each of the cutter drums 1a, 2a may stop at a predetermined position (or a starting point).

Of the underground excavators 1 and 2, a first underground excavator 1 is provided with three small-diameter boring means 3a, 3b, 3c in a front portion of the excavator 1, each of which boring means 3a, 3b, 3c is of a press-boring type to bore a small-diameter hole oriented parallel to a longitudinal axis of the first underground excavator 1. Incidentally, each of the small-diameter boring means 3a, 3b, 3c is mounted on a rear side portion of the cutter drum 1a of the first underground excavator 1. In addition, in a condition in which each of the small-diameter boring means 3a, 3b, 3c stays in its predetermined position or starting point, each of the small-diameter boring means 3a, 3b, 3c may move forward through a through-hole formed in the cutter drum 1a.

Now, as shown in FIG. 1, the reference character X denotes a tunneling direction passing through both of a longitudinal axis $x_1-x_1$ of the first underground excavator 1 and a longitudinal axis $x_2-x_2$ of a second underground excavator 2, the reference character Z denotes a vertical direction perpendicular to the tunneling direction X, the reference character Y denotes a horizontal direction perpendicular to the tunneling direction X, and the reference character $O_1$ denotes an intersection point of the above directions X, Y, Z, which point is the origin of a three-demensional coordinate system composed of the above directions X, Y, Z. As is clear from FIG. 1, of the three small-diameter boring means 3a, 3b, 3c, a first one 3a is disposed in a position deviated in the direction Z from the origin $O_1$ by a distance of "r", a second one 3b is disposed in a position deviated in the direction Y from the origin $O_1$ by a distance of "r" and a third one 3c is disposed in a position deviated also in the direction Y by a distance of "−r" so as to be oppositely disposed from the second one 3b with respect to the origin $O_1$. Consequently, in case that a central point of the first underground excavator 1 forms the origin $O_1$ of the coordinate system (X, Y, Z), positions or points Ba, Bb and Bc of the small-diameter boring means 3a, 3b and 3c have the following coordinates:

Ba: (0, 0, r),
Bb: (0, r, 0) and
Bc: (0, −r, 0), respectively.

On the other hand, as shown in FIG. 1, of three magnetic-field generating means 4a, 4b, 4c, a first one 4a is disposed in a position deviated in the direction Z from the origin $O_1$ by a distance of "r", a second one 4b is disposed in a position deviated in the direction Y from the origin $O_1$ by a distance of "r" and a third one 4c is disposed in a position deviated also in the direction Y from the origin $O_1$ by a distance of "−r". Each of the magnetic-field magnetic-field generating means 4a, 4b, 4c is constructed of a pair of square-shaped coil members one of which extends in the direction Z and the other of which extends in the direction Y. Each of the magnetic-field generating means 4a, 4b, 4c is mounted on an outer side or an inner side of a front surface of the cutter drum 2a of the second underground excavator 2. Central positions or points ta, tb and tc of the magnetic-field generating means 4a, 4b and 4c have the following coordinates in the coordinate system (X, Y, Z):

ta: $(X_{ta}, Y_{ta}, Z_{ta})$,
tb: $(X_{tb}, Y_{tb}, Z_{tb})$ and
tc: $(X_{tc}, Y_{tc}, Z_{tc})$, respectively.

Figure 4:
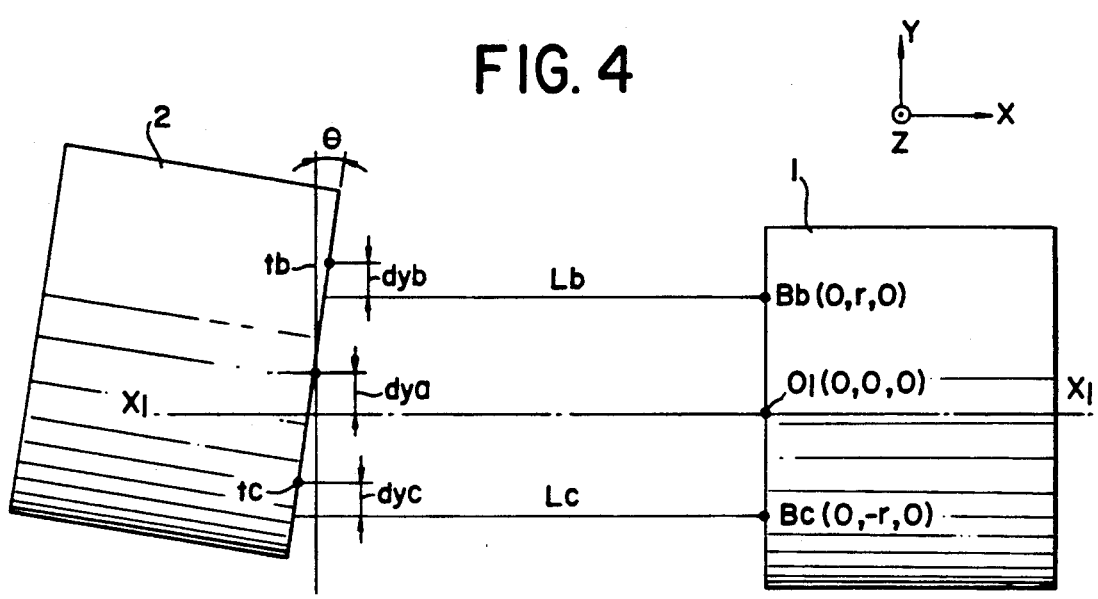
FIGS. 4 and 5 are diagrams of the first embodiment of the present invention in the three-dimensional coordinate system, employed in calculation of a deviation amount in angle of the underground excavator from y-axis and z-axis, respectively.
Figure 5:
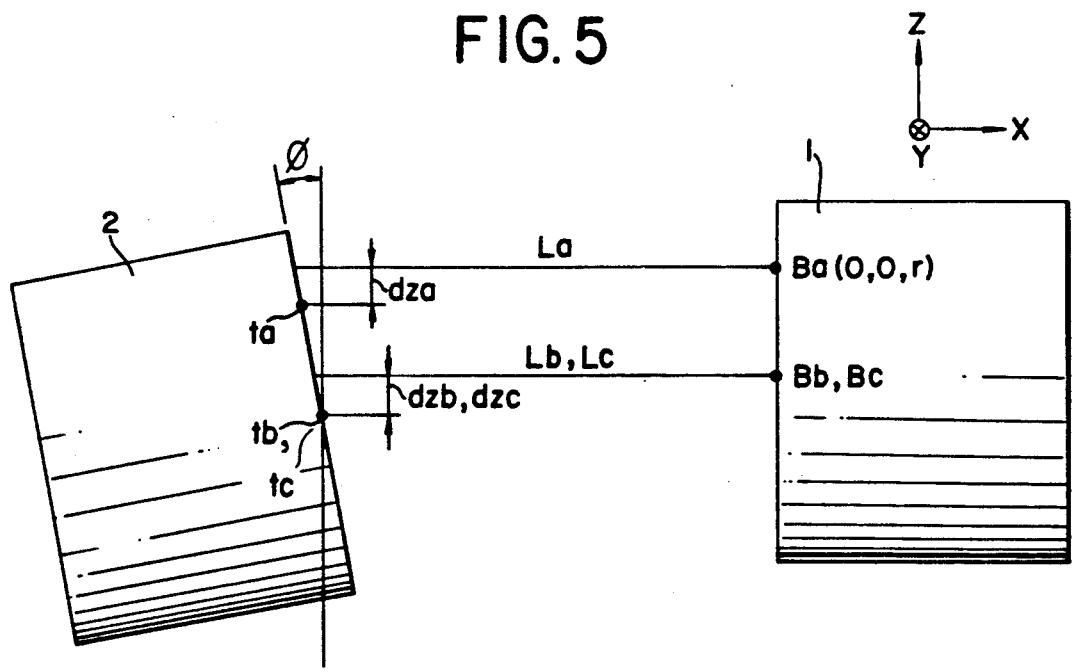

In addition, as shown in FIGS. 4 and 5, the small-diameter boring means 3a, 3b and 3c is provided with head portions 5a, 5b and 5c, respectively. In these head portions 5a, 5b and 5c are so mounted magnetic-field detecting means 6a, 6b and 6c as to be oppositely disposed from the magnetic-field generating means 4a, 4c and 4c, respectively. The magnetic-field detecting means 6a, 6b and 6c are used to detect deviation amounts of the head portions 5a, 5b and 5c of the small-diameter boring means 3a, 3b and 3c in the directions Y and Z from the magnetic-field generating means 4a, 4b and 4c, respectively. Such deviation amounts are represented by the following coordinates: (dya, dza), (dyb, dzb) and (dyc, dzc).

Figure 2:
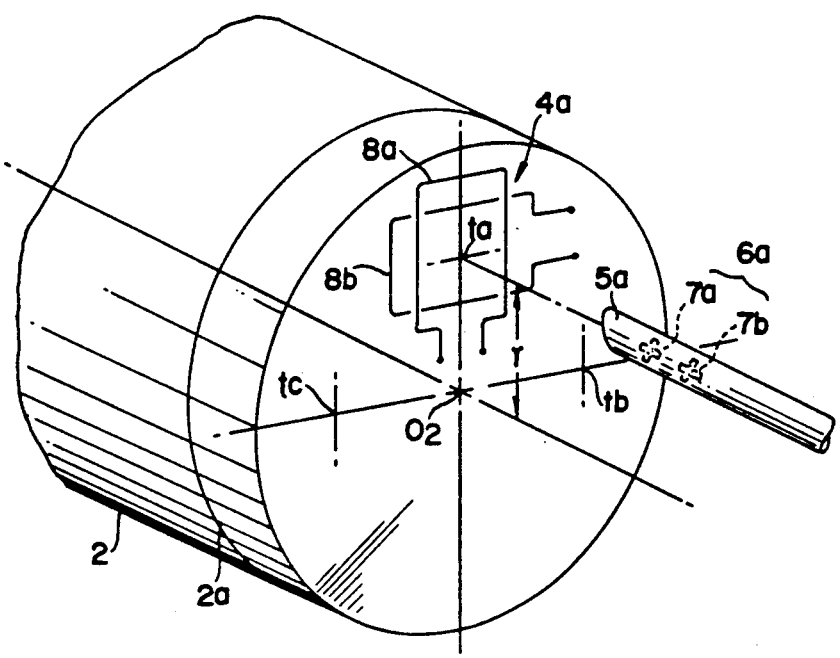
FIG. 2 is a schematic perspective view of an essential part of the first embodiment of the present invention shown in FIG. 1.

As shown in FIG. 2, each of the magnetic-field detecting means 6a, 6b and 6c is constructed of a pair of detecting units 7a and 7b. These detecting units 7a and 7b are used for detecting the deviation amounts of each of the small-diameter boring means 3a, 3b and 3c in the directions Y and Z, respectively.

Figure 3:
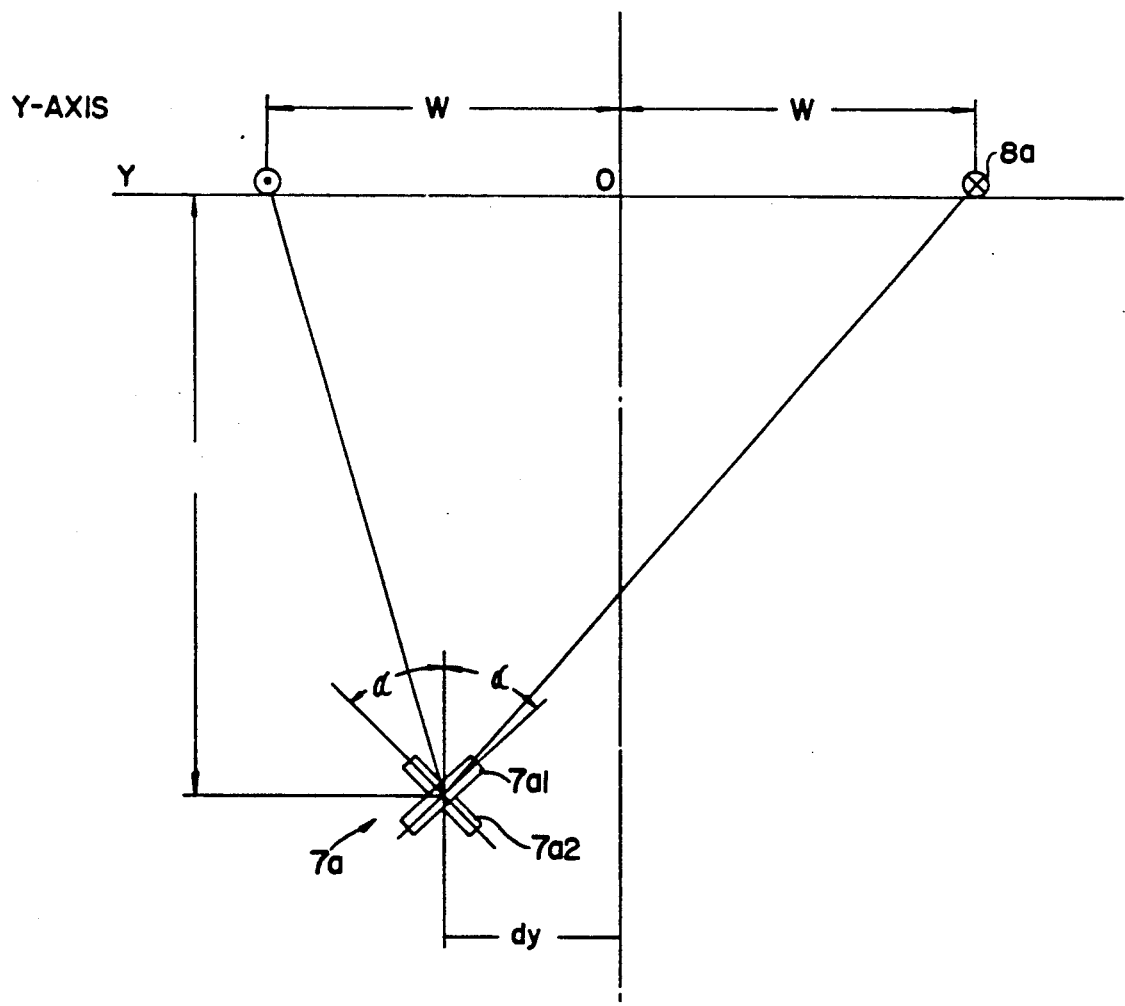
FIG. 3 is a schematic diagram of a magnetic-field detecting means for detecting a deviation amount in position of a head portion of each of small-diameter boring means employed in the first embodiment of the present invention shown in FIG. 1, illustrating the principle of the magnetic-field detecting means.

FIG. 3 shows a basic principle for detecting the deviation amount dy of the small-diameter boring means 3a in the direction Y by means of the detecting unit 7a of the magnetic-field detecting means 6a. The detecting unit 7a is used for detecting the deviation amount of each of the small-diameter boring means 3a, 3c and 3c in the direction Y, while constructed of a pair of coil members $7a_1$ and $7a_2$ which intersect with each other at a predetermined angle. In construction, one 8a of the square-shaped loop cable members 8a, 8b of each of the magnetic-field generating means 4a, 4b and 4c is disposed parallel to the y-axis of the coordinate system (X, Y, Z) to have a coil width of 2W a central point of which coil width is denoted by the reference numeral 0 in FIG. 3. In operation, an alternating current I flows through the loop cable member 8a to produce a magnetic field. Under such circumstances, when the detecting unit 7a of the magnetic-field detecting means 6a moves to a position X toward the loop cable member 8a in the direction X, the deviation amount dy of the detecting unit 7a from a plane perpendicular to the direction Y (in which plane the central point O of the coil width 2W of the loop cable member 8a lies) is represented by the following equation (1):

$$dy = ((Va - Vb)/(Va + Vb)) \times (X/2) \qquad (1)$$

wherein: Va and Vn represent voltages induced in the coil members $7a_1$ and $7a_2$, respectively.

As described above, it is possible to determine distances in the direction X between each of the magnetic-field detecting means 6a, 6b, 6c and the targets or magnetic-field generating means 4a, 4b, 4c as well as the voltages thus induced in each of the coil members of each of the magnetic-field detecting means 6a, 6b, 6c, whereby the deviation amounts (dya, dza), (dyb, dzb) and (dyc, dzc) in the directions Y and Z of the magnetic-field detecting means 6a, 6b and 6c may be calculated, respectively.

Now, as shown in FIG. 1, in a starting position or point condition in which the first underground excavator 1 is oppositely disposed from the second underground excavator 2 while spaced apart therefrom by a predetermined distance in tunneling the earth and these excavators 1, 2 have no deviation in angle of their cutter drums $1a$, $2a$ from the designed tunneling line, the tunneling operation starts as follows.

In the above starting point condition, the three small-diameter boring means $3a$, $3b$, $3c$ mounted on the first underground excavator 1 begin to dig the tunnel. These means $3a$, $3b$, $3c$ of the first excavator 1 continuously dig the tunnel until their front-end portions reach the front surface of the second underground excavator 2. At this time, it is possible to measure at the tunneling site of the first excavator 1 each of lengths La, Lb, Lc of small-diameter holes having been dug by the small-diameter boring means $3a$, $3b$, $3c$. When the small-diameter boring means $3a$, $3b$, $3c$ of the first underground excavator 1 reach the second underground excavator 2, digging resistance as well as the strength of magnetic fields vary to enable the operators of the small-diameter boring means $3a$, $3b$, $3c$ to know that the boring means $3a$, $3b$, $3c$ reach the second excavator 2.

In addition, at this time, the above-mentioned deviation amounts (dya, dza), (dyb, dzb) and (dyc, dzc) in the directions Y and Z of the magnetic-field detecting means $6a$, $6b$, $6c$ mounted in the front-end portions of the small-diameter boring means $3a$, $3b$, $3c$ relative to the magnetic-field generating means $4a$, $4b$, $4c$ may be calculated by an equation similar to the above equation (1).

Under such circumstances, in case that the excavators 1, 2 are spaced apart from each other by the lengths La, Lb, Lc of small-diameter holes being dug by the small-diameter boring means $3a$, $3b$, $3c$, and the central point of the first excavator 1 forms the origin $O_1$ of the coordinate system (X, Y, Z), coordinates ta, tb, tc of each of central points of the magnetic-field generating means $4a$, $4b$, $4c$ are represented as follows:

$$ta:(Xta, Yta, Zta) = (-La, -dya, r-dza) \quad (2);$$

$$tb:(Xtb, Ytb, Ztb) = (-Lb, r-dyb, -dzb) \quad (3); \text{ and}$$

$$tc:(Xtc, Ytc, Ztc) = (-Lc, -r-dyc, -dzc) \quad (4).$$

Based on the above coordinates ta, tb, tc, it is possible to calculate coordinates (Xo, Yo, Zo) of a starting point of the second underground excavator 2 in the coordinate system (X, Y, Z) by the following equations (5), (6) and (7):

$$Xo = (Xtb + Xtc)/2 \quad (5);$$

$$Yo = (Ytb + Ytc)/2 \quad (6); \text{ and}$$

$$Zo = (Ztb + Ztc)/2 \quad (7).$$

On the other hand, as shown in FIG. 4, in case that the angle of the front-end surface of the second underground excavator 2 from the y-axis of the coordinate system (X, Y, Z) is $\theta$, the $\theta$ is calculated by the following equation (8):

$$\theta = \tan^{-1}((Xtb - Xtc)/(Ytb - Ytc)) \quad (8)$$

In the same manner as the above, as shown in FIG. 5, in case that the angle of the front-end surface of the second underground excavator 2 from the z-axis of the coordinate system (X, Y, Z) is $\psi$, the $\psi$ is calculated by the following equation (9):

$$\psi = \tan^{-1}((Xta - Xo)/(Zta - Zo)) \quad (9)$$

FIG. 6 is a schematic block diagram of the first embodiment of the apparatus of the present invention. In signal processing, as shown in a block "A" of FIG. 6, of the three magnetic-field generating means $4a$, $4b$, $4c$ provided in the second underground excavator 2, for example, one $4a$ constructed of the loop cable members $8a$, $8b$ generates alternating-current (a-c) magnetic fields with predetermined frequencies determined by oscillators $9a_1$, $9a_2$. The thus generated a-c magnetic fields are detected by the detecting units $7a$ and $7b$ of the magnetic-field detecting means $6a$ respectively, which means $6a$ is mounted in the front-end portion of the small-diameter boring means $3a$ which extends forward from the front-end surface of the first underground excavator 1. Of the thus detected a-c magnetic fields, predetermined a-c magnetic fields are selected through filter elements $10a_1$ and $10a_2$, respectively. Then, the thus selected a-c magnetic fields are amplified through amplifiers $11a_1$ and $11a_2$ to produce the thus amplified signals dya and dza, respectively. Together with these amplified signals dya and dza, a length signal Xa issued from a boring-length detecting element $12a$ is supplied to an analog/digital (A/D) converter 13 in which these signals dya, dza and Xa are converted into digital values to be supplied to an arithmetic means 14 which performs necessary calculations to issue outputs to a display unit 15 for displaying relative positions of the first excavator 1 and the second excavator 2 on a screen of the display unit 15, which excavators 1, 2 should be brought into contact with each other at the end of the tunneling operation. The above described is the signal processing as to the magnetic-field generating means $4a$ of the second underground excavator 2.

The other signal processing ranging from oscillators connected with the remaining magnetic-field generating means $4b$ and $4c$ to the A/D converters 13 is the same as the above-described signal processing. Consequently, in order to avoid redundancy in description, the other signal processing is not described. Incidentally, the other signal processing is performed in blocks B and C shown in FIG. 6 in the same manner as that in the block A shown in FIG. 6.

FIG. 7 shows a second embodiment of the apparatus of the present invention. As is clear from FIG. 7, the first underground excavator 1 of the first embodiment of the present invention shown in FIG. 1 is replaced with a terminal vertical shaft 16 in the second embodiment of the present invention. Consequently, in tunneling operation in the second embodiment of the present invention, the second underground excavator 2 digs a tunnel toward a predetermined reference position provided in the terminal vertical shaft 16. At the same time, as is in the first underground excavator 1 in the first embodiment of the present invention, three small-diameter boring means $3a'$, $3b'$, $3c'$ are installed in the terminal vertical shaft 16 so as to be disposed in the predetermined reference position therein, and begin to dig small-diameter holes toward the front-end surface of the second underground excavator 2.

Since magnetic-field detecting operation performed in the second embodiment of the present invention shown in FIG. 7 is the same as that performed in the first embodiment of the present invention shown in FIG. 1, it is possible to easily determine a relative position of the second underground excavator 2 of the second embodiment of the present invention relative to the predetermined reference position in the terminal vertical shaft 16.

We claim:

1. An apparatus for detecting a position of an underground excavator in tunneling the earth, comprising:
   a plurality of magnetic-field generating means provided in a front-end surface of a first underground excavator;
   a plurality of small-diameter boring means each of which bores a small-diameter hole oriented toward said front-end surface of said underground excavator so as to be oppositely disposed from said underground excavator to have a front end thereof disposed in the vicinity of each of said magnetic-field generating means of said underground excavator;
   a plurality of magnetic-field detecting means each of which is used for detecting a magnetic field generated by each of said magnetic-field generating means of said underground excavator, each of said magnetic-field detecting means being provided in a front-end portion of each of said small-diameter boring means to issue a detection signal; and
   an arithmetic means for calculating a relative position of said underground excavator relative to positions of said small-diameter boring means on the basis of said detection signal issued from each of said magnetic-field detecting means and a length of said small-diameter hole bored by each of said small-diameter boring means.

2. The apparatus for detecting the position of the underground excavator in tunneling the earth, as set forth in claim 1, wherein:
   each of said small-diameter boring means is provided in a front-end surface of a second underground excavator which digs the tunnel oriented toward said first underground excavator.

3. The apparatus for detecting the position of the underground excavator in tunneling the earth, as set forth in claim 1, wherein:
   each of said small-diameter boring means is disposed in each of predetermined reference positions within a vertical shaft.

4. The apparatus for detecting the position of said underground excavator in tunneling the earth, as set forth in claim 2, wherein:
   each of said magnetic-field generating means is disposed in a predetermined position through which a y-axis or a z-axis pass, which y-axis and said z-axis form a second three-dimensional coordinate system together with an x-axis forming a longitudinal axis of said second underground excavator, said y-axis being disposed to intersect with said z-axis and said x-axis at right angles at a second origin of said second coordinate system and forming a horizontal axis, said z-axis being disposed to intersect with said y-axis and said x-axis at right angles at said second origin and forming a vertical axis; and
   each of said small-diameter boring means provided with a magnetic-field detecting means is disposed in a predetermined position through which a y-axis and or a z-axis pass, which y-axis and said z-axis form a first three-dimensional coordinate system together with an x-axis forming a longitudinal axis of said first underground excavator, said y-axis being disposed to intersect with said z-axis and said x-axis at right angles at a first origin of said first coordinate system and forming a horizontal axis, said z-axis being disposed to intersect with said y-axis and said x-axis at right angles at said first origin and forming a vertical axis;
   whereby, based on deviation amounts in position of said magnetic-field generating means and said magnetic-field detecting means and the lengths of small-diameter holes bored by said small-diameter boring means, the relative positions of said first and said second underground excavator are calculated.

5. The apparatus for detecting the position of said underground excavator in tunneling the earth, as set forth in claim 4, wherein:
   each of said magnetic-field generating means and each of said magnetic-field detecting means is constructed of a pair of coil elements.

* * * * *